(12) United States Patent
Akanuma et al.

(10) Patent No.: US 10,396,644 B2
(45) Date of Patent: Aug. 27, 2019

(54) VIBRATION MOTOR

(71) Applicant: Nidec Seimitsu Corporation, Ueda-shi, Nagano-ken (JP)

(72) Inventors: Tomohiro Akanuma, Ueda (JP); Mitsuru Oi, Ueda (JP); Tetsufumi Hayashi, Ueda (JP)

(73) Assignee: NIDEC SEIMITSU CORPORATION, Nagano (JP)

( * ) Notice: Subject to any disclaimer, the term of this patent is extended or adjusted under 35 U.S.C. 154(b) by 212 days.

(21) Appl. No.: 15/286,603

(22) Filed: Oct. 6, 2016

(65) Prior Publication Data

US 2017/0110949 A1   Apr. 20, 2017

(30) Foreign Application Priority Data

Oct. 16, 2015   (JP) .................................. 2015-204915

(51) Int. Cl.
*H02K 33/00* (2006.01)

(52) U.S. Cl.
CPC .................................. *H02K 33/00* (2013.01)

(58) Field of Classification Search
CPC ......... H02K 33/00; H02K 33/02; H02K 33/04
USPC .................................................... 310/25, 15
See application file for complete search history.

(56) References Cited

U.S. PATENT DOCUMENTS

| 8,269,379 | B2* | 9/2012 | Dong | H02K 33/16 |
| | | | | 310/25 |
| 9,025,796 | B2* | 5/2015 | Furuichi | H04M 19/047 |
| | | | | 310/14 |
| 9,093,870 | B2* | 7/2015 | Kanai | H02K 1/28 |
| 9,979,258 | B2* | 5/2018 | Takagi | H02K 7/085 |
| 2014/0125151 | A1* | 5/2014 | Furukawa | H02K 35/00 |
| | | | | 310/25 |
| 2014/0152126 | A1* | 6/2014 | Kim | B06B 1/045 |
| | | | | 310/25 |

FOREIGN PATENT DOCUMENTS

CN   201839133 U   5/2011

OTHER PUBLICATIONS

Akanuma, T., et al.; "Vibration Motor"; U.S. Appl. No. 15/286,602, filed Oct. 6, 2016.
Akanuma, T., et al.; "Vibration Motor"; U.S. Appl. No. 15/286,604, filed Oct. 6, 2016.
Akanuma, T., et al.; "Vibration Motor"; U.S. Appl. No. 15/286,606, filed Oct. 6, 2016.

* cited by examiner

*Primary Examiner* — Forrest M Phillips
(74) *Attorney, Agent, or Firm* — Keating & Bennett, LLP

(57) ABSTRACT

A vibration motor includes a stationary portion including a base and an annular coil; a vibrator including a magnet, and supported to be capable of vibrating in one direction with respect to the stationary portion; and an elastic member arranged between the stationary portion and the vibrator. The base includes a columnar portion arranged to project upward in a vertical direction perpendicular to the one direction. An outside surface of the columnar portion is arranged opposite to an inside surface of the coil.

6 Claims, 15 Drawing Sheets

VIBRATION MOTOR

CROSS REFERENCE TO RELATED APPLICATIONS

This application claims the benefit of priority to Japanese Patent Application No. 2015-204915 filed on Oct. 16, 2015. The entire contents of this application are hereby incorporated herein by reference.

BACKGROUND OF THE INVENTION

1. Field of the Invention

The present invention relates to a vibration motor.

2. Description of the Related Art

Due to a recent improvement in haptic technology (i.e., technology for conveying information through the sense of touch), there is a demand for vibration motors that not only have a conventional vibration function for silent notification but also are capable of providing fine vibration, such as, for example, haptic feedback.

Here, U.S. Pat. No. 8,269,379, for example, discloses a vibration motor including a coil fixed on a board, and arranged on a lower side of a magnet included in a moving portion.

In the vibration motor disclosed in U.S. Pat. No. 8,269,379, the coil with an adhesive applied to a lower surface thereof is placed on the board, and then, a jig is pressed against the coil from above to position the coil vertically and horizontally. The jig is arranged along an inside surface and an outside surface of the coil to position the coil.

Use of the jig, however, decreases efficiency in an operation of fitting the coil. In addition, a portion of the adhesive may protrude out of a gap between the coil and the board and be transferred to the jig, and the portion of the adhesive transferred to the jig may be attached to an upper surface of a coil of another vibration motor during fitting of the coil.

In the vibration motor, a vertical clearance space between a vibrator and the coil is so small that even the adhesive attached to the upper surface of the coil might lead to a malfunction of the vibration motor.

In view of the above circumstances, the present invention has been conceived to provide a vibration motor which is able to achieve increased efficiency in an operation of fitting a coil.

SUMMARY OF THE INVENTION

A vibration motor according to a preferred embodiment of the present invention includes a stationary portion including a base and an annular coil; a vibrator including a magnet, and supported to be capable of vibrating in one direction with respect to the stationary portion; and an elastic member arranged between the stationary portion and the vibrator. The base includes a columnar portion arranged to project upward in a vertical direction perpendicular to the one direction. An outside surface of the columnar portion is arranged opposite to an inside surface of the coil.

The vibration motor according to the above preferred embodiment of the present invention is able to achieve increased efficiency in an operation of fitting the coil.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

1. First Preferred Embodiment

Figure 1:
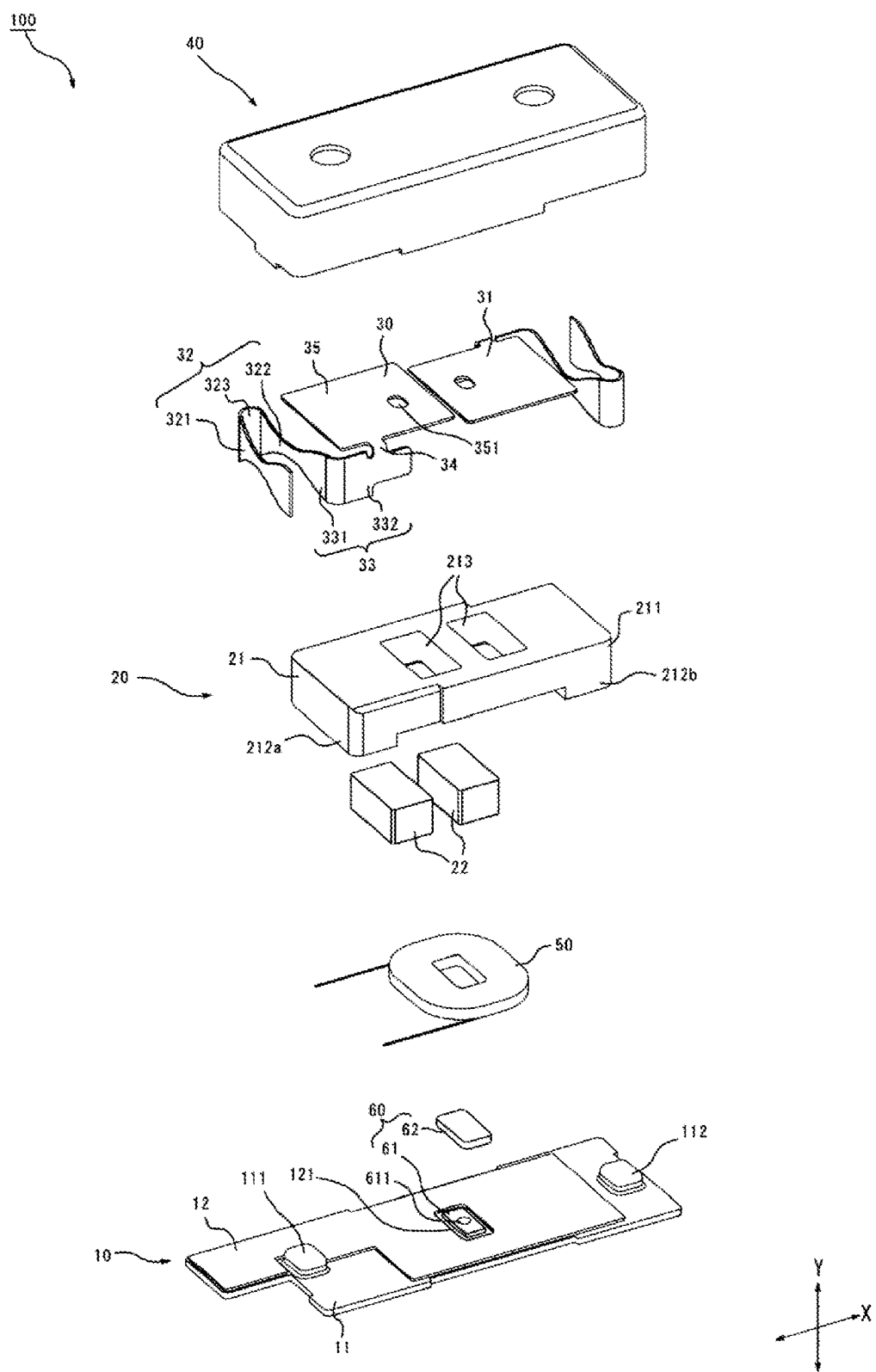
FIG. 1 is an exploded perspective view of a vibration motor according to a first preferred embodiment of the present invention.
Figure 2:
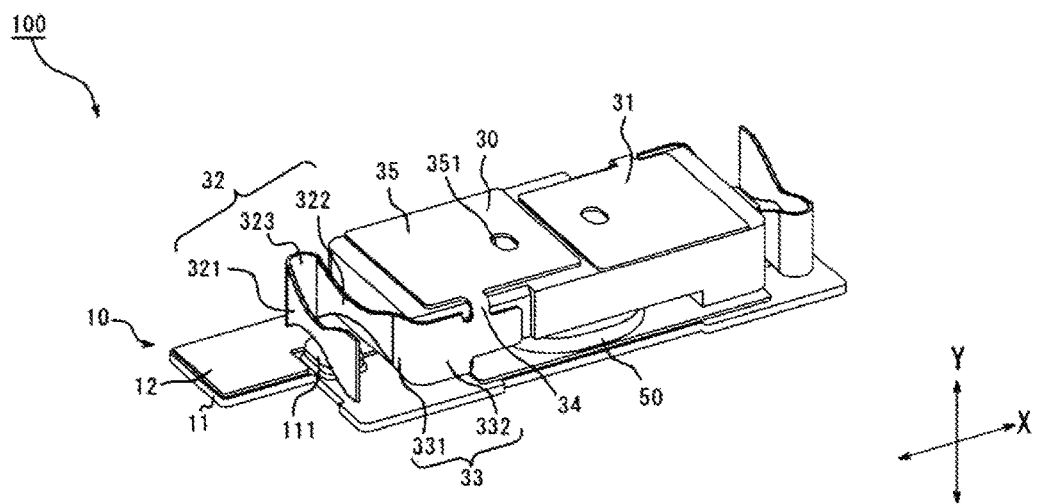
FIG. 2 is a perspective view of the vibration motor according to the first preferred embodiment of the present invention.
Figure 3:
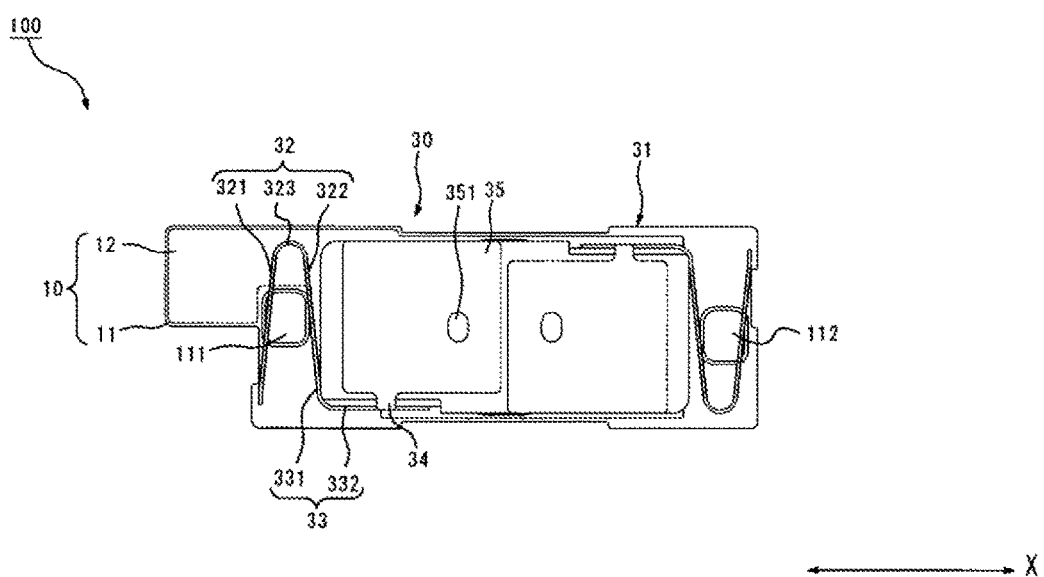
FIG. 3 is a top view of the vibration motor according to the first preferred embodiment of the present invention.
Figure 4:
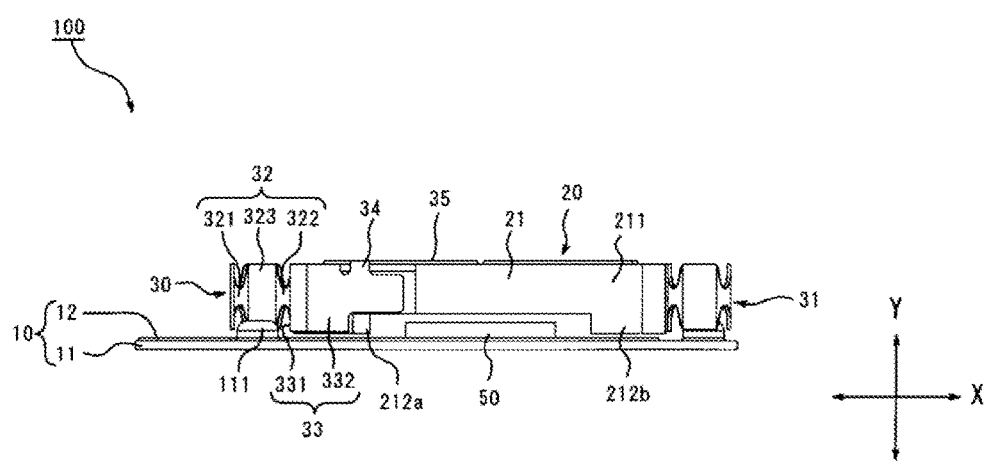
FIG. 4 is a side view of the vibration motor according to the first preferred embodiment of the present invention.

Hereinafter, exemplary preferred embodiments of the present invention will be described with reference to the accompanying drawings. FIG. 1 is an exploded perspective view of a vibration motor according to a first preferred embodiment of the present invention. FIG. 2 is a perspective view of the vibration motor according to the first preferred embodiment of the present invention. FIG. 3 is a top view of the vibration motor according to the first preferred embodiment of the present invention. FIG. 4 is a side view of the vibration motor according to the first preferred embodiment of the present invention. Each of FIGS. 2, 3, and 4 illustrates the vibration motor with a cover thereof removed therefrom.

In each of FIGS. 1 to 4, the right-left direction is defined as one direction, which is denoted as an X direction. Meanwhile, a vertical direction, which is a direction perpendicular to the one direction, is denoted as a Y direction.

For example, the upper side in FIG. 1 is the upper side in the vertical direction (i.e., the Y direction). The same is true of the other drawings. It should be noted, however, that the above definitions of the directions are not meant to restrict in any way the orientation of a vibration motor according to any preferred embodiment of the present invention.

1.1 Overall Structure

A vibration motor 100 according to the present preferred embodiment includes a base 10, a coil 50, a vibrator 20, an elastic member 30, an elastic member 31, and a cover 40. The base 10 includes a base portion 11, a board 12, and a columnar member 62. The vibration motor 100 includes a casing including the base portion 11 and the cover 40. The board 12 may be either a rigid board or a flexible board. The coil 50 is fitted to an upper surface of the base 10 (this fitting will be described in detail below). That is, the vibration motor 100 includes the vibrator 20, the elastic member 30, and a stationary portion including the base 10, the coil 50, and the cover 40. That is, the stationary portion includes the casing and the coil 50.

The vibrator 20 includes a weight 21 and magnets 22. Each magnet 22 is arranged in a cavity portion 213 defined in the weight 21. That is, each magnet 22 is held by the weight 21. Each magnet 22 is arranged on the upper side of the coil 50. That is, the vibrator 20 includes the magnets 22. Each magnet 22 is arranged on the upper side of the coil 50 in the vertical direction (i.e., the Y direction).

As described in detail below, one end of the elastic member 30 is fixed to the weight 21, while an opposite end of the elastic member 30 is fixed to an inner wall surface of the cover 40. That is, the elastic member 30 is arranged between the stationary portion and the vibrator 20. The other elastic member is fixed in a manner similar to the manner in which the elastic member 30 is fixed. The vibrator 20 is thus supported by the elastic members 30 and 31 such that the vibrator 20 is capable of vibrating in the one direction (i.e., the X direction) with respect to the stationary portion. The coil 50, the vibrator 20, and the elastic members 30 and 31 are arranged in an interior space defined by the cover 40 and the base 10.

A magnetic field is generated around the coil 50 as a result of the coil 50 being energized through an electrical circuit on the board 12. The magnetic field generated around the coil 50 interacts with magnetic fields generated by the magnets to cause reciprocating vibration of the vibrator 20 in the one direction.

1.2 Structures of Elastic Member and Vibrator

Next, the elastic member 30 and the vibrator 20 will now be described in detail below. The elastic member 31 is similar in structure to the elastic member 30, and a description of the elastic member 31 is therefore omitted.

The elastic member 30 includes a plate spring portion 32, a fixing portion 33, a connection portion 34, and a top plate portion 35, and these portions are joined to one another. The plate spring portion 32 includes beam portions 321 and 322 and a joining portion 323. The joining portion 323 joins one end portion of the beam portion 321, which is in the shape of a plate, and one end portion of the beam portion 322, which is in the shape of a plate, to each other. That is, the plate spring portion 32 includes the plurality of beam portions 321 and 322 and the joining portion 323.

The elastic member 30 includes the plate spring portion 32, which is arranged to support at least one of both ends of the vibrator 20 with respect to the one direction (i.e., the X direction).

The fixing portion 33 includes a first wall portion 331 arranged to extend perpendicularly to the one direction (i.e., the X direction) of the vibrator 20, and a second wall portion 332 joined to the first wall portion 331 and arranged to extend along the one direction of the vibrator 20. One end of the first wall portion 331 is joined to another end of the beam portion 322. An opposite end of the first wall portion 331 is joined to one end of the second wall portion 332. An opposite end of the second wall portion 332 is joined to the top plate portion 35 through the connection portion 34. Note that, instead of the second wall portion 332, the first wall portion 331 may alternatively be joined to the top plate portion 35 through the connection portion 34. Also note that each of the first and second wall portions 331 and 332 may be joined to the top plate portion 35 through the connection portion 34. The top plate portion 35 is arranged to have an area greater than the area of the fixing portion 33.

The weight 21 includes a first weight portion 211 and second weight portions 212a and 212b. The first weight portion 211 is in the shape of a rectangular parallelepiped. The second weight portions 212a and 212b are arranged at both ends of the vibrator 20 with respect to the one direction, and are arranged to extend downward from a lower surface of the first weight portion 211.

The second wall portion 332 is fixed to a surface defined by side surfaces of the first weight portion 211 and the second weight portion 212a which extend in the one direction. The first wall portion 331 is fixed to a surface defined by side surfaces of the first weight portion 211 and the second weight portion 212a which extend in the direction perpendicular to the one direction. That is, both the first and second wall portions 331 and 332 are fixed to a side surface of the vibrator 20. This fixing may be accomplished by, for example, welding or adhesion using an adhesive. In the case where the wall portion is fixed by spot welding performed on a peripheral portion of the wall portion, for example, the wall portion is directly fixed to the side surface of the vibrator. In the case where the wall portion is fixed by using the adhesive, for example, the wall portion is indirectly fixed to the side surface of the vibrator with the adhesive therebetween.

The top plate portion 35 is fixed to an upper surface of the first weight portion 211. This fixing may be accomplished by, for example, welding or adhesion using an adhesive. In the case of welding, spot welding may be performed on a peripheral portion of the top plate portion 35, for example. The top plate portion 35 is arranged opposite to the magnet 22 in the vertical direction.

The elastic member 31 is similar in structure to the elastic member 30. A connection portion (which corresponds to the connection portion 34 of the elastic member 30) of the elastic member 31 is fixed to the weight 21 at a position diagonally opposite to the connection portion 34 at an upper surface of the weight 21. That is, the vibration motor 100 is provided with the two elastic members 30 and 31. Each of the two elastic members 30 and 31 is arranged to support a separate one of both the ends of the vibrator 20 with respect to the one direction (i.e., the X direction).

The fixing of the fixing portion 33 to the side surface of the vibrator 20 and the fixing of the top plate portion 35, which is joined to the fixing portion 33, to the upper surface of the vibrator 20 as described above contribute to preventing the vibration of the vibrator 20 from causing a detachment of the fixing portion 33 or the top plate portion 35 from the vibrator 20 or a break of the fixing portion 33 or the top plate portion 35. In addition, the joining of the fixing portion 33 and the top plate portion 35 through the connection portion 34 further increases the above effect. In addition, the fixing portion 33 is fixed to both the first weight portion 211 and the second weight portion 212a, and this increases the strength with which the elastic member 30 is fixed to the vibrator 20.

Note that not both but only one of the first and second wall portions 331 and 332 may be fixed to the vibrator 20.

The elastic member 30 is made of, for example, SUS632J1, which is a ferromagnetic spring material. That is, at least a portion of the top plate portion 35 is made of a ferromagnetic material. The top plate portion 35 is thus able to serve as a back yoke for the magnet 22. Note that the elastic member 30 may not necessarily be made of a ferromagnetic material, and that, alternatively, an upper surface of the top plate portion 35 may be coated with a ferromagnetic material.

The top plate portion 35 includes a through hole 351 passing therethrough in the vertical direction. The first weight portion 211 includes the cavity portions 213, each of which passes therethrough in the vertical direction. The magnets 22 are arranged in the cavity portions 213. That is, the through hole 351 is arranged opposite to both the corresponding cavity portion 213 and the corresponding magnet 22 in the vertical direction. This allows a positioning pin to be inserted through the cavity portion 213, without the magnet 22 arranged therein, and through the through hole 351 to position the top plate portion 351.

Figure 5:
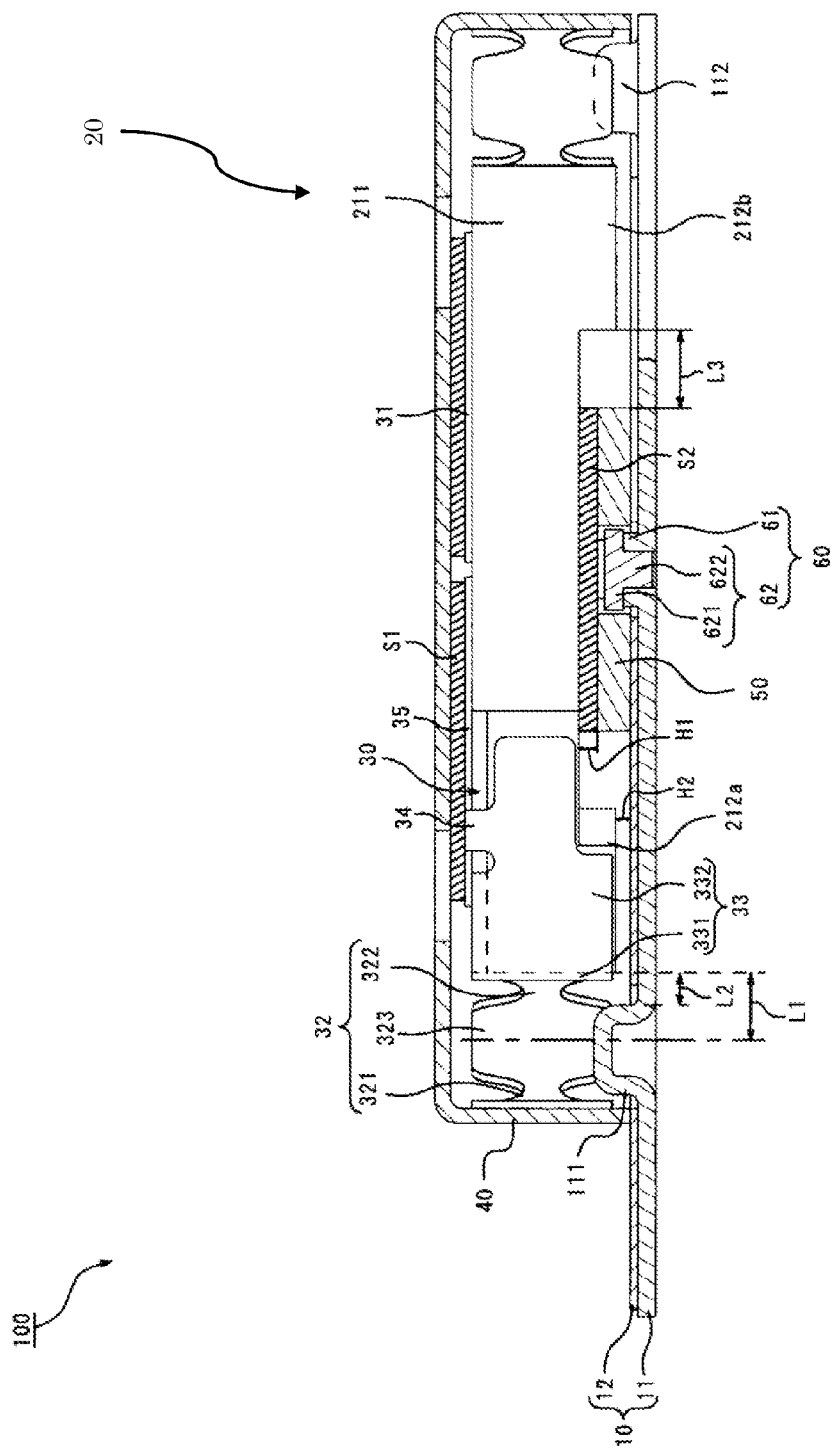
FIG. 5 is a side sectional view of the vibration motor according to the first preferred embodiment of the present invention.

Here, FIG. 5 is a side sectional view of the vibration motor 100 with the cover 40. As illustrated in FIG. 5, a first gap is defined between the top plate portion 35 and the cover 40. A magnetic fluid S1 having viscosity is arranged in the first gap. That is, the magnetic fluid S1 is arranged in a gap between the casing and a surface of the vibrator 20 on the side opposite to the lower surface thereof.

In addition, a second gap is defined between an upper surface of the coil 50 and the lower surface of the first weight portion 211 of the vibrator 20. A magnetic fluid S2 having viscosity is arranged in the second gap. The above arrangement allows each of the magnetic fluids S1 and S2 to serve as a damper when the vibrator 20 vibrates. Moreover, the magnetic fluids S1 and S2 possess magnetism, and are thus able to stay on the top plate portion 35 and the coil 50, respectively, each of which is made of a metal, even if the vibrator 20 vibrates. Note that only one of the magnetic fluids S1 and S2 may be provided. In other words, the magnetic fluid may be arranged only in the first gap or only in the second gap.

When the weight 21 includes only the first weight portion 211, which is in the shape of a plate, a space is defined between the weight 21 and the base 10 in the vibration motor 100. This space includes an area in which the coil 50 is arranged, and an area in which the coil 50 is not arranged. Addition of the second weight portions 212a and 212b in the area in which the coil 50 is not arranged increases the weight of the weight 21. As illustrated in FIG. 5, each of the second weight portions 212a and 212b is arranged opposite to the coil 50 in the one direction. That is, an area in which the coil 50 is not arranged and which is near the coil 50 is used to dispose each of the second weight portions 212a and 212b, each of which extends downward from the first weight portion 211. This enables an increase in the weight of the weight 21 without increasing the thickness of the vibration motor 100. This leads to realizing a vibration motor having a small thickness and a large inertial force.

In addition, as illustrated in FIG. 5, a vertical distance H1 between the coil 50 and the first weight portion 211 is greater than a vertical distance H2 between the second weight portion 212a and the board 12. This contributes to preventing the first weight portion 211 from colliding against the coil 50 to damage the coil 50 when, for example, a fall of the vibration motor 100 occurs. This effect is particularly favorable when the magnetic fluid S2 is not provided.

1.3 Structure to Restrict Movement of Vibrator

Next, a structure to restrict movement of the vibrator 20 will now be described in detail below.

The base portion 11 includes a first projecting portion 111, which is arranged to project upward, and a second projecting portion 112, which is arranged to project upward, on separate sides of the vibrator 20 in the one direction. Each of the first and second projecting portions 111 and 112 is arranged between the vibrator 20 and the cover 40. That is, the stationary portion includes the projecting portions 111 and 112 each of which projects in the vertical direction. At least one first projecting portion 111 is arranged between the vibrator 20 and the casing on one side of the vibrator 20 in the one direction. Further, at least one second projecting portion 112 is arranged between the vibrator 20 and the casing on an opposite side of the vibrator 20 in the one direction.

The first projecting portion 111 is arranged at a position between the beam portions 321 and 322. The same is true of the second projecting portion 112. The coil 50 is arranged between the first and second projecting portions 111 and 112.

Each of the first and second projecting portions 111 and 112 is defined by, for example, press forming. This secures a sufficient strength of each projecting portion. Note that the projecting portion may not be an integral portion of the base portion 11, but may alternatively be a separate member.

Figure 6:
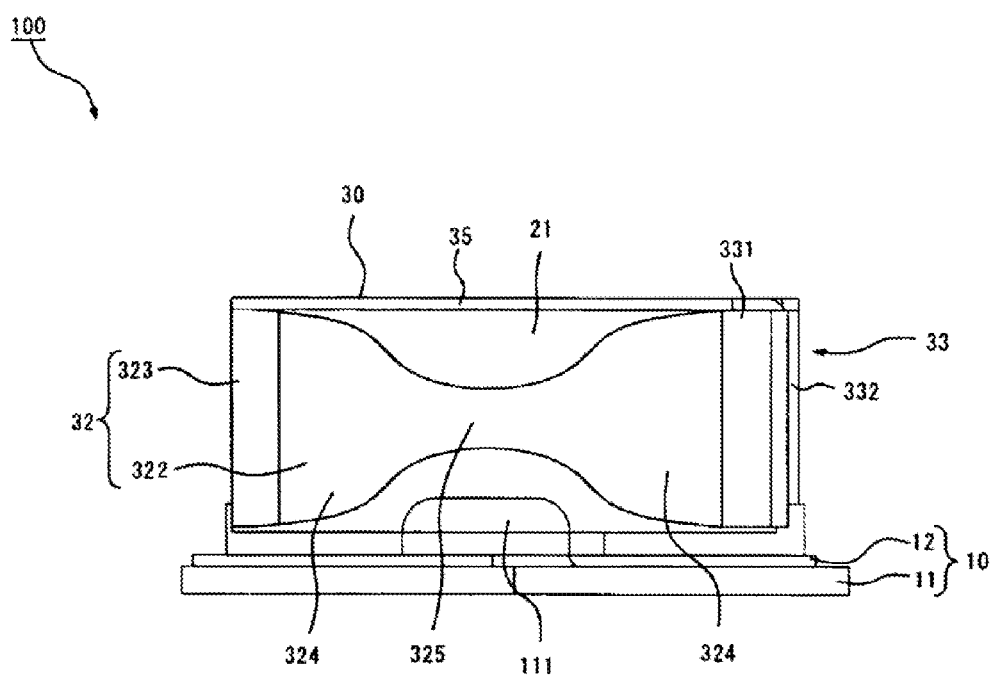
FIG. 6 is a side view of the vibration motor according to the first preferred embodiment of the present invention.

Here, FIG. 6 is a side view of the vibration motor 100 in the state of FIG. 2 when viewed from one side in the one direction. FIG. 6 illustrates a view of the vibration motor 100 when viewed from the position between the beam portions 321 and 322. As illustrated in FIG. 6, a portion of the first projecting portion 111 is opposed to a portion of the second weight portion 212a. That is, a portion of each of the projecting portions 111 and 112 is opposed to a portion of the vibrator 20 in the one direction.

In addition, the beam portion 322 has middle portions along the length of the beam portion 322 cut out in the vertical direction, thus including a decreased width portion 325. That is, the decreased width portion 325 is defined as a result of portions of the plate spring portion 32 being cut out in the vertical direction. Further, the beam portion 322 includes increased width portions 324 on both sides of the decreased width portion 325, each increased width portion 324 having a vertical width greater than that of the decreased width portion 325. That is, the plate spring portion 32 includes the decreased width portion 325 and the increased width portions 324.

The decreased width portion 325 is above or below the first projecting portion 111 when viewed from one side in the one direction. That is, the decreased width portion is above or below the corresponding projecting portion when viewed from one side in the one direction. This contributes to preventing a contact between the elastic member 30 and the first projecting portion 111 when the vibrator 20 moves. In addition, the decreased width portion 325, which is provided in each of the beam portions 321 and 322, allows both the ends of the vibrator 20 with respect to the one direction to be supported by the two plate spring portions 32. This contributes to limiting an increase in the number of parts of the vibration motor 100. A similar relationship is established between the elastic member 31 and the second projecting portion 112.

In addition, as illustrated in FIG. 5, a distance L2 between the first projecting portion 111 and the vibrator 20 is arranged to be shorter than an effective range L1 of motion of the vibrator 20. Here, the effective range of motion refers to a range in which the vibrator 20 in a stationary state is capable of moving until the elastic member 30 is deformed to a maximum extent within the elastic range thereof. For example, in FIG. 5, a range in which the vibrator 20 in the stationary state is capable of moving until the plate spring portion 32 of the elastic member 30 is compressed to a maximum extent corresponds to the effective range of motion. That is, the distance between the vibrator 20 and each of the projecting portions 111 and 112 is shorter than the effective range of motion of the vibrator 20.

Thus, if a fall of the vibration motor 100, for example, causes the vibrator 20 to move to a large extent, the vibrator 20 makes contact with the first projecting portion 111 to be restrained from further movement, before moving to the limit of the effective range of motion. This contributes to more effectively preventing damage to the elastic member 30.

The above structure for movement restriction as realized by the first projecting portion 111, the vibrator 20, and the elastic member 30 is similarly realized by the second projecting portion 112, the vibrator 20, and the elastic member 31. As described above, the first projecting portion 111 is arranged between the vibrator 20 and the cover 40 on one side of the vibrator 20 in the one direction. The second projecting portion 112 is arranged between the vibrator 20 and the cover 40 on the opposite side of the vibrator 20 in the one direction. Note that a plurality of first projecting portions 111 may be arranged on the one side of the vibrator 20 in the one direction, and a plurality of second projecting portions 112 may be arranged on the opposite side of the vibrator 20 in the one direction. Also note that a projecting portion(s) may be arranged on only one side of the vibrator 20 in the one direction.

In addition, as illustrated in FIG. 5, a distance L3 between the second weight portion 212b and the coil 50 as measured in the one direction is greater than the distance L2 between the second weight portion 212a and the first projecting portion 111. This prevents the second weight portion 212b from coming into contact with the coil 50 when the vibrator 20 moves to such an extent that the second weight portion 212a is brought into contact with the first projecting portion 111. This contributes to preventing damage to the coil 50. The same is true of the relationship between the distance L3 between the second weight portion 212a and the coil 50 as measured in the one direction, and the distance between the second weight portion 212b and the second projecting portion 112. Thus, a large movement of the vibrator 20 to either side in the one direction would not cause damage to the coil 50.

1.4 Structure for Positioning Coil

Figure 7:
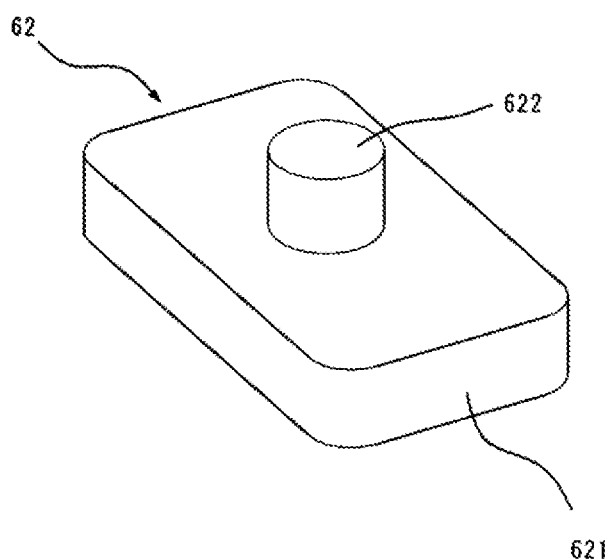
FIG. 7 is a perspective view of a columnar member according to the first preferred embodiment of the present invention.

Next, the structure for positioning the coil 50 in the vibration motor 100 will now be described in detail below. As illustrated in FIG. 1, the base portion 11 includes a first columnar portion 61 arranged to project upward to assume the shape of a plate. The first columnar portion 61 includes a recessed portion 611. As shown in a perspective view of FIG. 7, the columnar member 62 includes a second columnar portion 621, which is in the shape of a plate, and a third columnar portion 622 arranged to project to assume a columnar shape and made of the same material as that of the second columnar portion 621.

Figure 8:
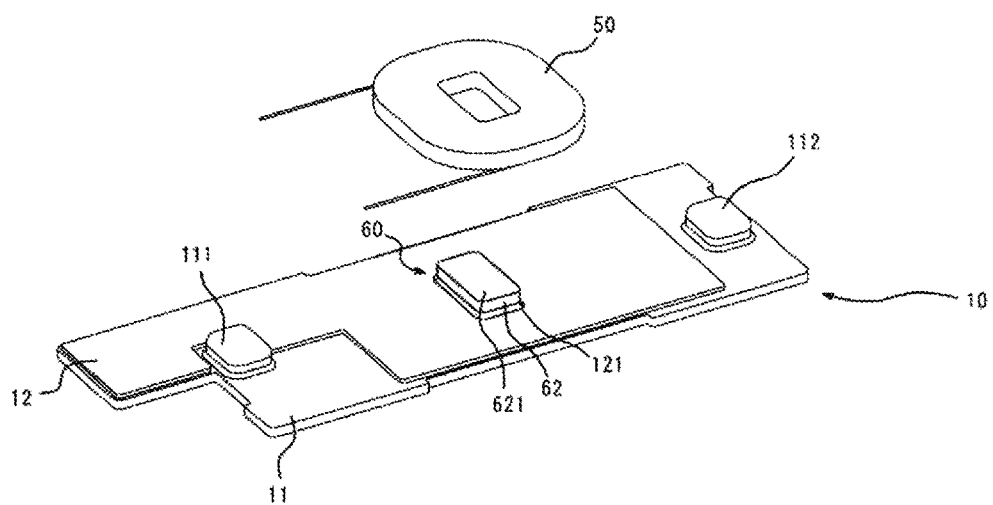
FIG. 8 is a perspective view of a base according to the first preferred embodiment of the present invention.

The third columnar portion 622 is inserted into the recessed portion 611 to bring the second columnar portion 621 into contact with the first columnar portion 61 to fix the columnar member 62 to the first columnar portion 61. This fixing is accomplished by welding or adhesion using an adhesive, for example. Thus, a columnar portion 60 includes the first columnar portion 61 and the columnar member 62. That is, the base 10 includes the columnar portion 60, which is arranged to project upward in the vertical direction perpendicular to the one direction. In addition, the board 12 includes a board through hole 121 passing therethrough in the vertical direction. The columnar portion 60 is inserted in the board through hole 121. The board 12 is thus positioned on and fixed to the base portion 11. This situation is illustrated in a perspective view of FIG. 8.

Figure 9:
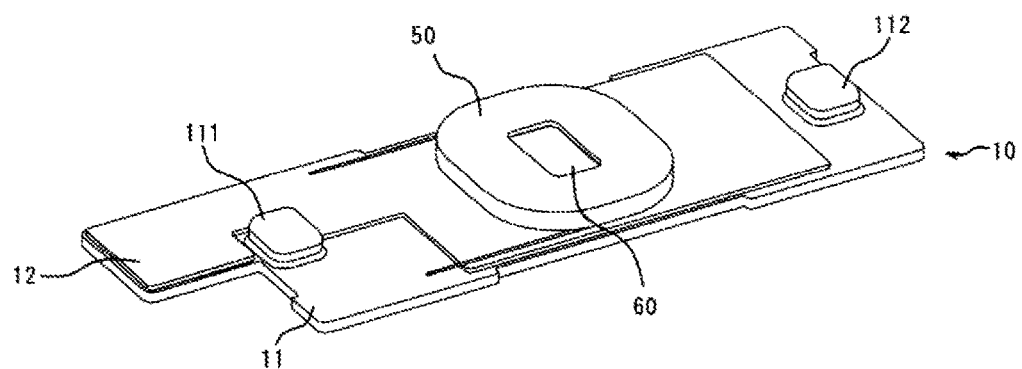
FIG. 9 is a perspective view illustrating a coil fitted to the base according to the first preferred embodiment of the present invention.

Then, as illustrated in a perspective view of FIG. 9, the coil 50 is fixed to the board 12 with an outside surface of the columnar portion 60 arranged opposite to an inside surface of the coil 50, which is annular. At this time, a double-sided tape is stuck to a lower surface of the coil 50, for example, and the coil 50 is pressed against the board 12. The above structure allows the coil 50 to be easily positioned without use of a jig, increasing efficiency in fitting of the coil 50.

An upper end surface of the columnar portion 60 is arranged at a level lower than that of an upper end surface of the coil 50. Thus, in the case where an adhesive having a relatively high fluidity is applied to the lower surface of the coil 50 and the coil 50 is pressed against the board 12 to fix the coil 50, for example, a surface of the adhesive is defined between the upper end surface of the columnar portion 60 and the inside surface of the coil 50 if the adhesive flows from the lower surface of the coil 50 into a gap between the inside surface of the coil 50 and the outside surface of the columnar portion 60 and further onto the upper end surface of the columnar portion 60. This contributes to preventing the adhesive from being attached to the upper end surface of the coil 50.

Because no jig is used, the use of the adhesive having a relatively high fluidity would not lead to an attachment of the adhesive to a jig and allowing the jig to attach the adhesive to an upper surface of a next coil in an operation of fitting the next coil.

The adhesive arranged in the gap between the inside surface of the coil 50 and the outside surface of the columnar portion 60 as described above increases the strength with which the coil 50 is fixed in the vertical direction. In addition, the columnar portion 60 is made up of three members, i.e., the first, second, and third columnar portions 61, 621, and 622. This increases the precision with which the columnar portion 60 is formed, leading to an increase in precision in positioning the coil 50.

Note that the columnar portion 60 may be modified in other preferred embodiments of the present invention. For example, the board 12 may be arranged to include a columnar portion 60 projecting upward, without the board through hole 121 defined in the board 12.

Also note that the columnar portion 60 may be made of the same material as that of the base portion 11. For example, the columnar portion 60 may be defined by press working or molding. This simplifies the process of defining the columnar portion 60. Also note that a columnar portion 60 made of a resin may be defined by an insert molding process in combination with a plate portion of a base portion 11 made of a metal. This reduces the cost of the parts.

Also note that an electronic component, such as a capacitor or a transformer, mounted on the board 12 may be used as the columnar portion 60.

In the above-described first preferred embodiment, the weight 21 includes the second weight portions 212a and 212b each of which extends downward from the lower surface of the plate-shaped first weight portion 211. The weight, however, is not limited to this shape. For example, the second weight portions 212a and 212b may be omitted if the first weight portion 211 ensures sufficient vibration. In this case, a portion of each of the first and second projecting portions 111 and 112 is arranged opposite to the first weight portion 211 in the one direction.

2. Second Preferred Embodiment

Figure 10:
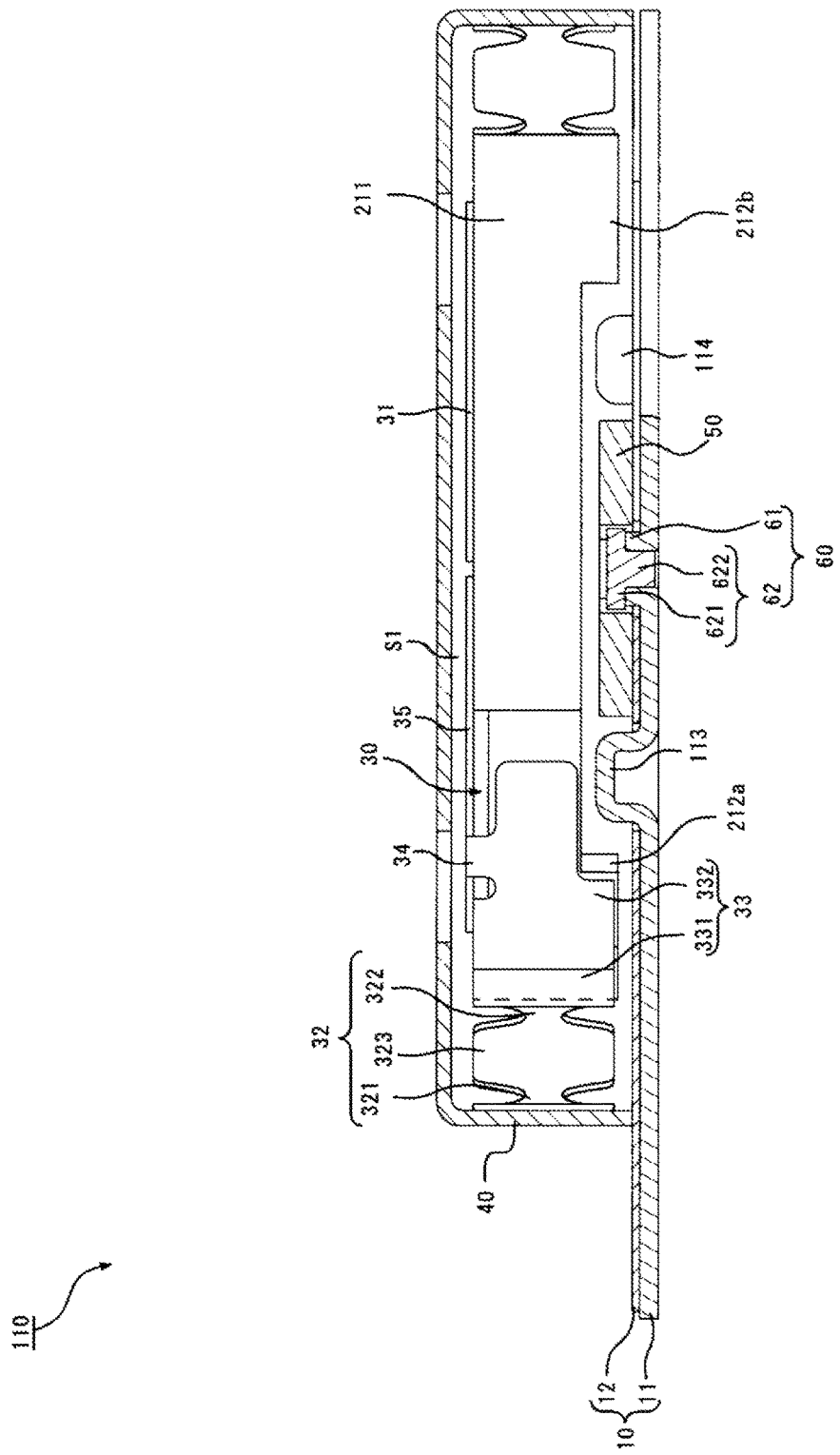
FIG. 10 is a side sectional view of a vibration motor according to a second preferred embodiment of the present invention.

Next, a second preferred embodiment of the present invention will now be described below. FIG. 10 is a side sectional view of a vibration motor 110 according to the present preferred embodiment (this figure corresponds to FIG. 5, which illustrates the first preferred embodiment). In the above-described first preferred embodiment, the first and second projecting portions 111 and 112, which serve to restrict the movement of the vibrator 20, are arranged on the far side of the second weight portions 212a and 212b, respectively, in the one direction with respect to the coil 50 as illustrated in FIG. 5. In contrast, in the present preferred embodiment, first and second projecting portions 113 and 114 are arranged between a coil 50 and second weight portions 212a and 212b, respectively, in the one direction as illustrated in FIG. 10.

In this preferred embodiment, the first and second projecting portions 113 and 114 do not interfere with elastic members 30 and 31, respectively, and this eliminates the need to define a decreased width portion in a beam portion of each elastic member as in the first preferred embodiment. This leads to securing a sufficient vertical dimension of the beam portion, resulting in improved rigidity of a plate spring portion 32.

3. Third Preferred Embodiment

Figure 11:
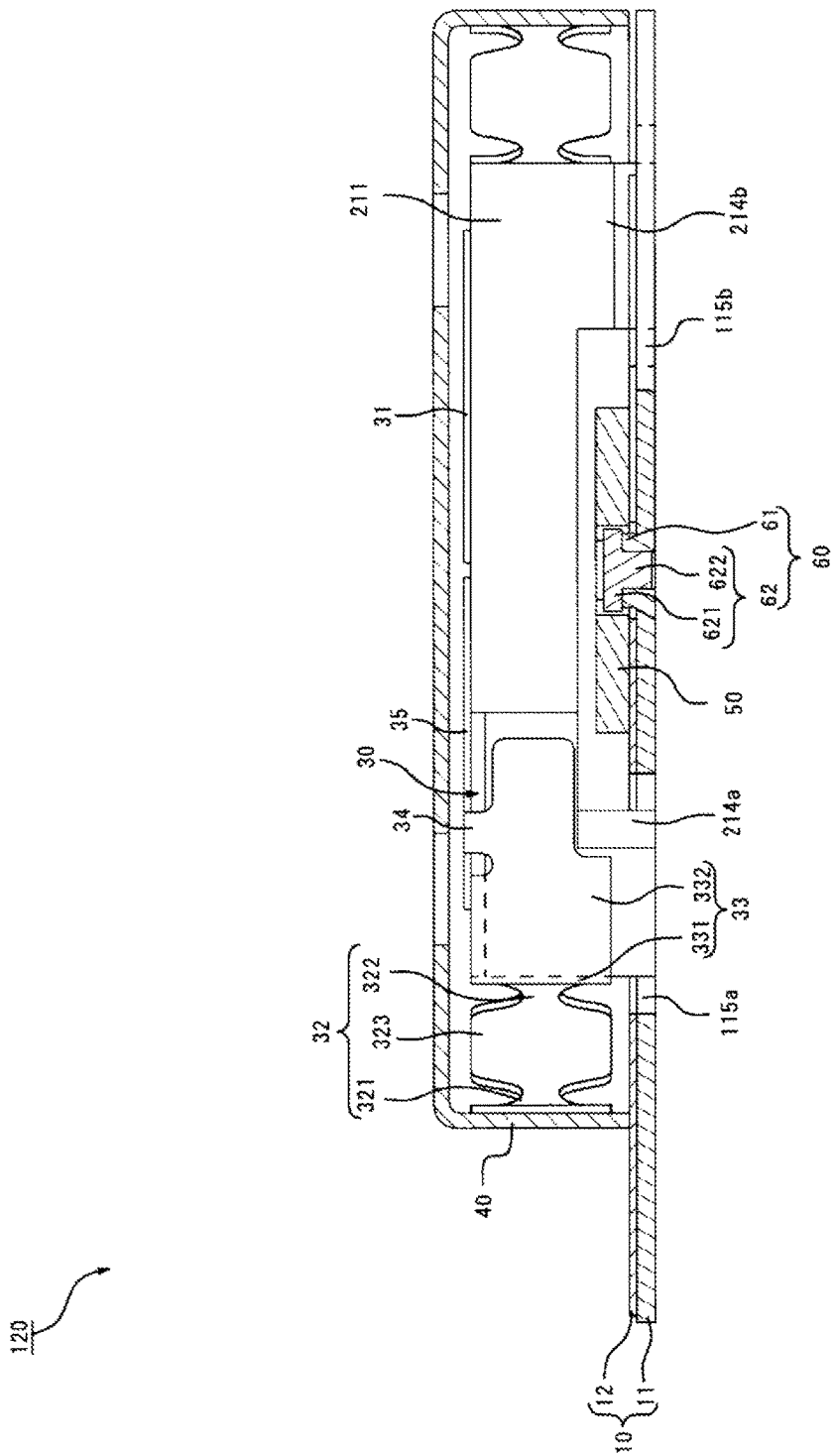
FIG. 11 is a side sectional view of a vibration motor according to a third preferred embodiment of the present invention.

Next, a third preferred embodiment of the present invention will now be described below. FIG. 11 is a side sectional view of a vibration motor 120 according to the present preferred embodiment (this figure corresponds to FIG. 5, which illustrates the first preferred embodiment). In the present preferred embodiment, accommodating portions 115a and 115b passing through a board 12 and a base portion 11 in the vertical direction are defined in a base 10. In addition, a portion of a second weight portion 214a is arranged in the accommodating portion 115a, and a portion of a second weight portion 214b is arranged in the accommodating portion 115b.

According to this preferred embodiment, movement of a vibrator 20 is restricted by a contact of the second weight portion 214a with the accommodating portion 115a, or a contact of the second weight portion 214b with the accommodating portion 115b, if the vibrator 20 moves to a large extent in the one direction. Note that each accommodating portion may alternatively be defined by a non-through recessed portion, instead of a through hole.

4. Fourth Preferred Embodiment

Figure 12:
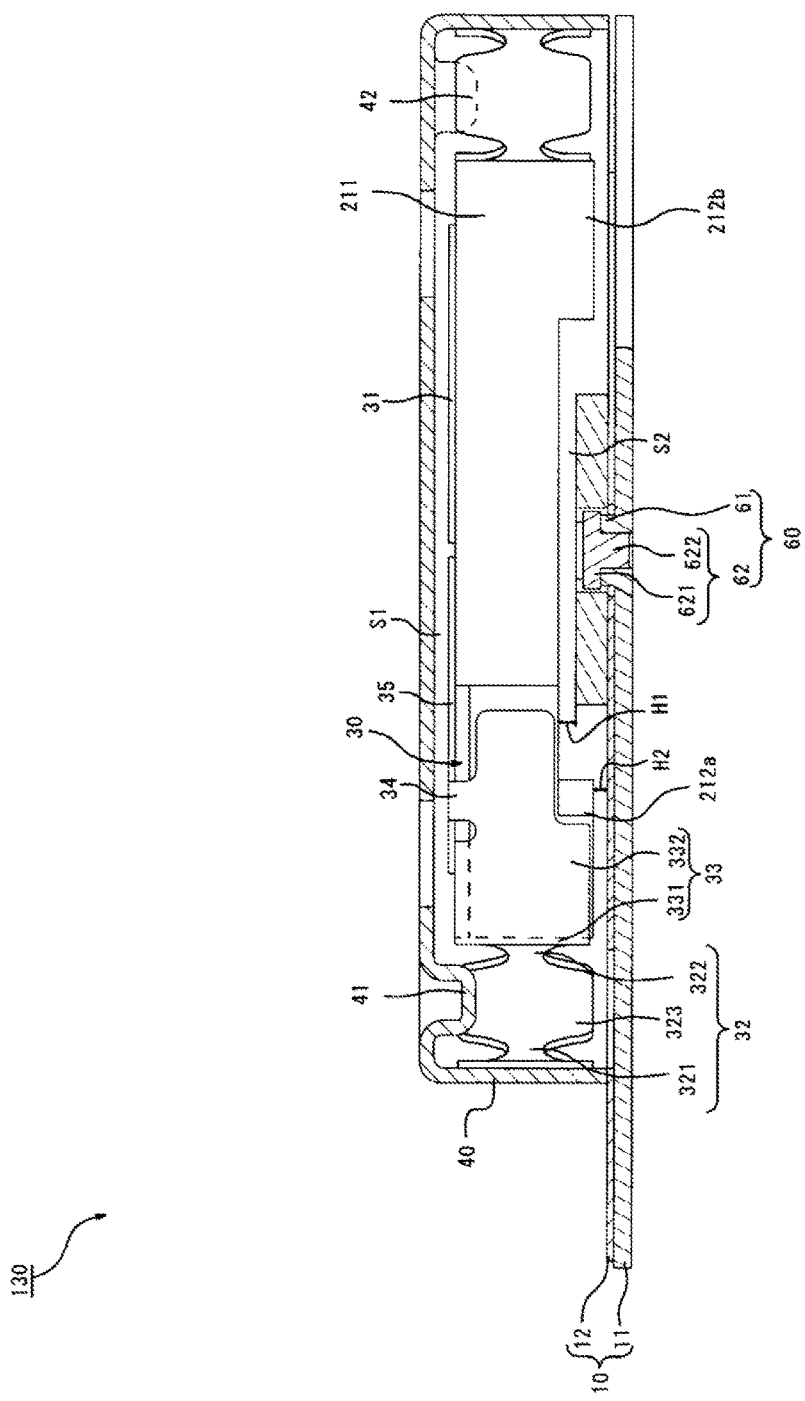
FIG. 12 is a side sectional view of a vibration motor according to a fourth preferred embodiment of the present invention.

Next, a fourth preferred embodiment of the present invention will now be described below. FIG. 12 is a side sectional view of a vibration motor 130 according to the present preferred embodiment (this figure corresponds to FIG. 5, which illustrates the first preferred embodiment). In the present preferred embodiment, a first projecting portion 41 and a second projecting portion 42 each of which projects downward from an inside surface of an upper surface portion of a cover 40 are provided. A beam portion of each of elastic members 30 and 31 includes a decreased width portion to prevent an interference with the first projecting portion 41 or the second projecting portion 42. Thus, movement of a vibrator 20 is restricted by a contact of a first weight portion 211 with the first projecting portion 41 or the second projecting portion 42 if the vibrator 20 moves to a large extent in the one direction.

That is, the casing includes the base portion 11, which is arranged on the lower side, and the cover 40, which is arranged to cover one surface of the base portion 11, and each of the projecting portions 111, 112, 113, 114, 41, and 42 is made of the same material as that of at least one of the base portion 11 and the cover 40.

5. Fifth Preferred Embodiment

Figure 13:
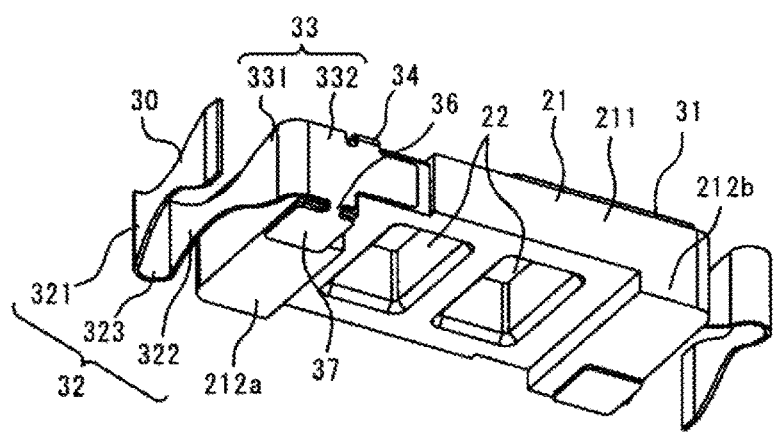
FIG. 13 is a perspective view of elastic members and a weight provided in a vibration motor according to a fifth preferred embodiment of the present invention when viewed from the lower side.
Figure 14:
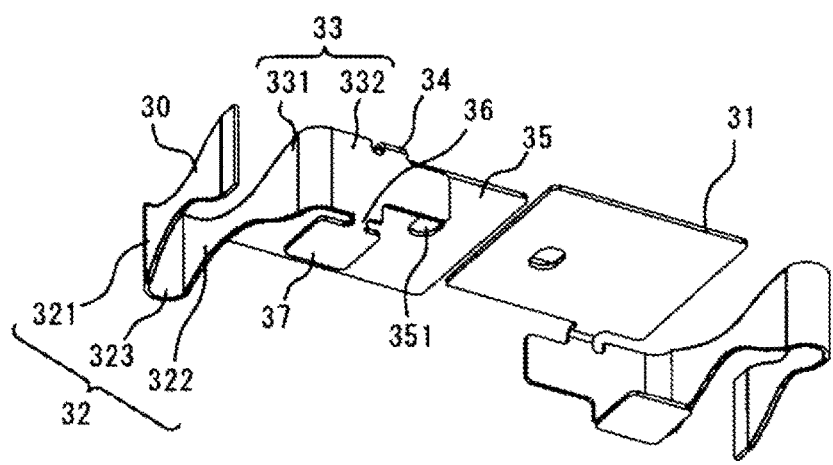
FIG. 14 is a perspective view of the elastic members provided in the vibration motor according to the fifth preferred embodiment of the present invention when viewed from the lower side.

Next, a fifth preferred embodiment of the present invention will now be described below. FIGS. 13 and 14 are perspective views of elastic members 30 and 31 and a weight 21 provided in a vibration motor according to the present preferred embodiment when viewed from the lower side (in FIG. 14, the weight 21 is not shown). In the present preferred embodiment, the elastic member 30 further includes a bottom plate portion 37 arranged opposite to a top plate portion 35 in the vertical direction with a vibrator 20 therebetween. The bottom plate portion 37 may be arranged to be in contact with the vibrator 20, or be arranged opposite to the vibrator 20 with a slight gap therebetween. The bottom plate portion 37 may be fixed to the vibrator 20. The bottom plate portion 37 is joined to a lower end of a second wall portion 332 through a connection portion 36. Note that the bottom plate portion 37 may alternatively be joined to a lower end of a first wall portion 331, instead of the second wall portion 332, through the connection portion 36. Further, the bottom plate portion 37 may alternatively be joined to the lower end of each of the first and second wall portions 331 and 332 through the connection portion 36.

Because the bottom plate portion 37 is arranged opposite to the top plate portion 35 in the vertical direction with the vibrator 20 therebetween, the strength with which the elastic member 30 and the vibrator 20 are fixed to each other is increased. In particular, in the case where the bottom plate portion 37 is arranged to be in contact with the vibrator 20, the vibrator 20 is held by portions of the elastic member 30 from both sides in the vertical direction, and therefore, a strong impact applied to the vibration motor because of a fall of the vibration motor, for example, would not cause a detachment of the elastic member 30 from the vibrator 20. In addition, in the case where the bottom plate portion 37 is arranged to be in contact with the vibrator 20, the bottom plate portion 37 can be used for positioning when the top plate portion 35 is fixed, and this leads to increasing efficiency in fitting of the top plate portion 35.

6. Sixth Preferred Embodiment

Figure 15:
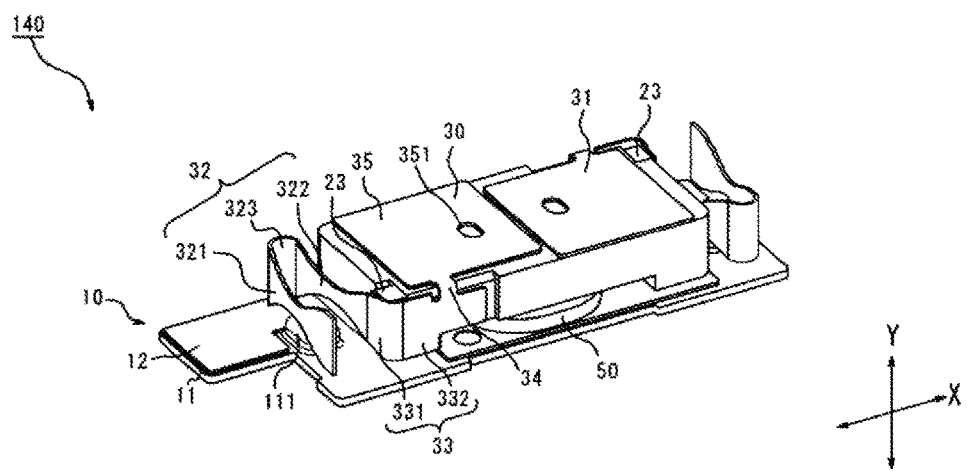
FIG. 15 is a perspective view of a vibration motor according to a sixth preferred embodiment of the present invention.

Next, a sixth preferred embodiment of the present invention will now be described below. FIG. 15 is a perspective view of a vibration motor 140 according to the present preferred embodiment. In the present preferred embodiment, a buffer member is arranged between a first wall portion 331 and an end surface of a vibrator 20 facing in the one direction. The buffer member 23 is made of an elastic material. The buffer member 23 is preferably made of, for example, a resin material such as a silicone, urethane, a fluorocarbon resin, or an acrylic resin, or a material that damps vibration, such as a damping material, such as αGEL.

Because the buffer member 23 is arranged between the first wall portion 331 and the end surface of the vibrator 20 facing in the one direction, the reciprocating vibration of the vibrator 20 can be damped. In more detail, if supply of drive signals is stopped, the vibrator 20, which has a great weight, freely vibrates due to inertia in the case where the buffer member 23 is not provided, but in the case where the buffer member 23 is provided, an interference between the vibrator 20 and the elastic member 30 produces an effect of damping action. Accordingly, when supply of electric current to a coil 50 is stopped to stop the vibration of the vibrator 20, the vibration of the vibrator 20 can be quickly stopped. Note that the buffer member 23 may be arranged in a recessed portion.

While preferred embodiments of the present invention have been described above, the preferred embodiments may be modified in various manners without departing from the scope and spirit of the present invention.

Preferred embodiments of the present invention are applicable to vibration motors provided in, for example, smartphones or gamepads.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration motor comprising:
a stationary portion including a base and an annular coil;
a vibrator including a magnet and a weight, and supported to be capable of vibrating in one direction with respect to the stationary portion; and
elastic members between the stationary portion and the vibrator; wherein
the base includes a pair of columnar portions projecting upward in a vertical direction perpendicular to the one direction; and
outside surfaces of the pair of columnar portions are opposite to an outside surface of the coil;
each of the pair of columnar portions is directly under respective ones of the elastic members; and
the weight includes extending portions positioned between the outside surfaces of the pair of columnar portions and the outside surface of the coil.

2. The vibration motor according to claim 1, further comprising an adhesive between the coil and the base.

3. The vibration motor according to claim 1, wherein
the base includes a base portion and a board arranged on the base portion;
the pair of columnar portions are included on the base portion; and
the board includes a board through hole passing therethrough in the vertical direction.

4. The vibration motor according to claim 1, wherein
the base includes a base portion and a board arranged on the base portion; and
the board includes the pair of columnar portions.

5. The vibration motor according to claim 4, wherein the pair of columnar portions are made of a same material as that of the base portion.

6. The vibration motor according to claim 2, wherein
the adhesive is between the coil and the base and inside of an inside surface of the coil; and
the adhesive is not attached to an upper end surface of the coil so that the inside surface of the coil defines an interface of a surface of the adhesive.

* * * * *